(12) United States Patent
Candeo

(10) Patent No.: US 9,874,403 B2
(45) Date of Patent: Jan. 23, 2018

(54) EVAPORATOR FINS IN CONTACT WITH END BRACKET

(75) Inventor: Marcelo Candeo, Anderson, SC (US)

(73) Assignee: Electrolux Home Products, Inc., Charlotte, NC (US)

( * ) Notice: Subject to any disclaimer, the term of this patent is extended or adjusted under 35 U.S.C. 154(b) by 1754 days.

(21) Appl. No.: 12/395,183

(22) Filed: Feb. 27, 2009

(65) Prior Publication Data

US 2010/0218925 A1  Sep. 2, 2010

(51) Int. Cl.
| F25D 21/06 | (2006.01) |
| F28D 1/047 | (2006.01) |
| B23P 15/26 | (2006.01) |
| F25B 39/02 | (2006.01) |
| F25D 17/06 | (2006.01) |
| F25D 21/08 | (2006.01) |
| F28F 1/32  | (2006.01) |
| F28F 9/00  | (2006.01) |

(52) U.S. Cl.
CPC ............ *F28D 1/0477* (2013.01); *B23P 15/26* (2013.01); *F25B 39/022* (2013.01); *F25D 17/067* (2013.01); *F25D 21/08* (2013.01); *F28F 1/32* (2013.01); *F28F 9/002* (2013.01); *F25B 2500/01* (2013.01); *Y10T 29/53113* (2015.01)

(58) Field of Classification Search
CPC ...... F25B 39/02; F25B 45/00; F25B 2345/00; F25D 21/008; F25D 17/06
USPC ............ 62/77, 276, 285, 298, 407, 426, 515
See application file for complete search history.

(56) References Cited

U.S. PATENT DOCUMENTS

| 1,788,068 | A |   | 1/1931  | Scott |
| 1,890,186 | A |   | 12/1932 | Lucke |
| 2,108,876 | A |   | 2/1938  | Vandoren |
| 2,437,452 | A | * | 3/1948  | Baird ............................ 165/135 |
| 3,196,632 | A |   | 7/1965  | Buffington |
| 3,369,595 | A | * | 2/1968  | Nelson ............................ 165/55 |
| 3,745,786 | A | * | 7/1973  | Laughlin et al. ............... 62/419 |
| 3,845,638 | A | * | 11/1974 | Apple et al. .................... 62/426 |
| 4,198,222 | A |   | 4/1980  | Wood |
| 4,369,978 | A |   | 1/1983  | Watanabe |
| 4,580,623 | A |   | 4/1986  | Smitte et al. |
| 5,186,022 | A |   | 2/1993  | Kim |
| 5,237,831 | A | * | 8/1993  | Sikora ............................ 62/159 |
| 5,255,536 | A |   | 10/1993 | Jung et al. |
| 5,425,414 | A |   | 6/1995  | Bradley, Jr. et al. |
| 6,145,336 | A |   | 11/2000 | Miller et al. |

(Continued)

*Primary Examiner* — Elizabeth Martin
(74) *Attorney, Agent, or Firm* — Pearne & Gordon LLP

(57) ABSTRACT

A refrigerator is provided with an evaporator assembly located in a compartment. The evaporator assembly includes a pipe, a fan assembly, a plurality of fins, a first and second bracket. The pipe is configured to transport a refrigerant that exchanges heat with an air stream from the compartment. The plurality of fins is inserted on the pipe. The brackets each include apertures to receive bent end portions of the pipe. The brackets are configured to hold the pipe and the fins in a specific position, to mount the evaporator assembly within the compartment, and restrict the air stream exiting the evaporator assembly from mixing with the air stream entering the evaporator assembly. The fins include end fins that are placed in direct contact with the first end bracket and are configured to further restrict the air stream from flowing through the plurality of apertures of the brackets.

9 Claims, 10 Drawing Sheets

(56) References Cited

U.S. PATENT DOCUMENTS

| | | |
|---|---|---|
| 6,209,342 B1 | 4/2001 | Banicevic et al. |
| 6,321,833 B1 | 11/2001 | O'Leary et al. |
| 6,370,775 B1 | 4/2002 | Reagen et al. |
| 6,378,204 B1 | 4/2002 | Kim et al. |
| 6,701,739 B2 * | 3/2004 | Morse ............................ 62/277 |
| 6,729,152 B2 | 5/2004 | Gully et al. |
| 6,964,296 B2 | 11/2005 | Memory et al. |
| 7,028,764 B2 | 4/2006 | Reagen |
| 7,032,406 B2 | 4/2006 | Hollen et al. |
| 7,059,394 B2 | 6/2006 | Cho et al. |
| 7,703,295 B2 | 4/2010 | Zangari et al. |
| 7,908,883 B2 * | 3/2011 | Wu et al. ........................ 62/441 |
| 7,987,684 B2 * | 8/2011 | Jeong et al. .................... 62/407 |
| 8,087,261 B2 * | 1/2012 | Lee et al. ........................ 62/407 |
| 2005/0150249 A1 * | 7/2005 | Ha et al. ........................ 62/515 |
| 2006/0272801 A1 | 12/2006 | Ikawa |
| 2007/0131392 A1 | 6/2007 | Minami et al. |
| 2007/0251682 A1 | 11/2007 | Sasaki |
| 2007/0256448 A1 | 11/2007 | Kim et al. |
| 2008/0017364 A1 | 1/2008 | Ichiyanagi |
| 2008/0202141 A1 * | 8/2008 | Lim et al. ....................... 62/285 |
| 2009/0038334 A1 | 2/2009 | Konig |
| 2009/0113924 A1 * | 5/2009 | Bae et al. ....................... 62/447 |
| 2010/0218521 A1 | 9/2010 | Lafaire et al. |

* cited by examiner

EVAPORATOR FINS IN CONTACT WITH END BRACKET

BACKGROUND OF THE INVENTION

The present invention relates generally to an evaporator assembly for an appliance, and more particularly, to a refrigeration appliance that includes an evaporator assembly.

Refrigeration appliances such as domestic refrigerators, typically have both a fresh food compartment and a freezer compartment or section. The fresh food compartment is where food items such as fruits, vegetables, and beverages are stored and the freezer compartment is where food items that are to be kept in a frozen condition are stored. The refrigerators are provided with refrigeration systems that maintain the fresh food compartments at temperatures somewhat greater than, or above, 0° C. and the freezer compartments at temperatures below 0° C.

The refrigeration systems for such refrigerators usually include an evaporator for the freezer compartment that cools the air in the freezer compartment of the refrigerator to temperatures below zero degrees Celsius. Air movers, such as fans for example, circulate the air in the freezer compartment for the purpose of bringing the cold air into contact with all sections of the freezer compartment.

Typically, an evaporator can include a plurality of fins that receive an external surface of a pipe through which refrigerant flows. The evaporator is configured to carry out heat exchange with external air passing over the fins and the external surface of pipes. The pipes can have a serpentine arrangement with a plurality of fins disposed around the pipes.

BRIEF SUMMARY OF THE INVENTION

The following presents a simplified summary of the invention in order to provide a basic understanding of some example aspects of the invention. This summary is not an extensive overview of the invention. Moreover, this summary is not intended to identify critical elements of the invention nor delineate the scope of the invention. The sole purpose of the summary is to present some concepts of the invention in simplified form as a prelude to the more detailed description that is presented later.

In accordance with one aspect of the present invention, a refrigeration appliance is provided comprising a compartment and an evaporator assembly located to cool the compartment. The evaporator assembly includes a pipe, a fan assembly, a plurality of fins, and a first end bracket and a second end bracket located at a first distance from the first end bracket. The pipe is configured to transport a refrigerant that exchanges heat with an air stream from the compartment that is entering the evaporator assembly. The fan assembly is configured to move the air stream exiting from the evaporator assembly to other portions of the refrigeration appliance. The pipe has a plurality of bent end portions to allow the pipe to wind itself repeatedly to form a plurality of rows. The plurality of fins are located between the plurality of the bent end portions. The first end bracket and the second end bracket each include a plurality of apertures to receive each bent end portion of the pipe. The first end bracket and the second end bracket are configured to hold the pipe and the plurality of fins in a specific position. The first end bracket and the second end bracket are configured to mount the evaporator assembly. The first end bracket and the second end bracket restrict the air stream exiting the evaporator assembly from mixing with the air stream entering the evaporator assembly. The plurality of fins include a plurality of end fins that are placed in direct contact with the first end bracket and are configured to further restrict the air stream from flowing through the plurality of apertures of the first end bracket and the second end bracket.

In accordance with another aspect of the present invention, a refrigeration appliance is provided comprises a freezer compartment, a fresh food compartment, and an evaporator assembly located in the freezer compartment. The evaporator assembly includes a first end bracket, a second end bracket located at a first distance from the first end bracket, a pipe extending between the first end bracket and the second end bracket of the evaporator assembly, a fan assembly, a plurality of apertures located on the first end bracket and the second end bracket, and a plurality of fins inserted on the pipe. The first end bracket and the second end bracket are configured to mount the evaporator assembly within the freezer compartment. The pipe is configured to transport a refrigerant that exchanges heat with an air stream from the fresh food compartment that enters the evaporator assembly between the first end bracket and the second end bracket. The fan assembly is configured to move the air stream exiting from the evaporator assembly to other portions of the refrigeration appliance. The pipe has a plurality of bent end portions where each of the plurality of the bent end portions is received by one of the plurality of apertures on the first end bracket and the second end bracket, where the bent end portions are configured to allow the pipe to wind itself repeatedly to form a plurality of rows between the first end bracket and the second end bracket. The plurality of fins are located between the first end bracket and the second end bracket. The plurality of fins include a plurality of end fins that are placed in direct contact with the first end bracket and the second end bracket and are configured to restrict the air stream from flowing through the plurality of apertures. The first end bracket and the second end bracket include a gasket on a first edge and a second edge of each end bracket where the gasket is configured to separate each end bracket from a liner of the freezer compartment to prevent a formation of frost on the liner.

In accordance with another aspect of the present invention, a method of assembling an evaporator assembly for a refrigeration appliance comprises the steps of providing a plurality of pipes, inserting a plurality of groups of fins on the plurality of pipes, bending each of the pipes along a first axis to form a second row for each of the plurality of pipes, bending each of the pipes along a second axis to form a third row for each of the plurality of pipes, repeatedly bending each of the pipes along the first axis and then the second axis to form additional rows of the pipes, installing a first end bracket about the first axis, installing a second end bracket about the second axis, placing the plurality of fins located closest to each end bracket in contact with each end bracket to prevent air from flowing through the plurality of apertures on each end bracket, and welding the first end and the second end of each of the plurality of pipes to other ends or pipe segments to assemble the plurality of pipes into one continuous pipe. The pipes are provided by starting at a first end and terminating at a second end where each pipe provided is in a different plane. Each fin from each group of fins receives each of the pipes provided. The groups of fins are inserted in alternating orientations. The first end bracket is installed by providing the first end bracket with a plurality of apertures that receive each of the plurality of bent end portions about the first axis. The second end bracket is installed by providing the second end bracket with a plurality of apertures that receive each of the plurality of bent end portions about the second axis.

BRIEF DESCRIPTION OF THE SEVERAL VIEWS OF THE DRAWINGS

The foregoing and other aspects of the present invention will become apparent to those skilled in the art to which the present invention relates upon reading the following description with reference to the accompanying drawings, in which.

DETAILED DESCRIPTION OF THE INVENTION

Figure 1:
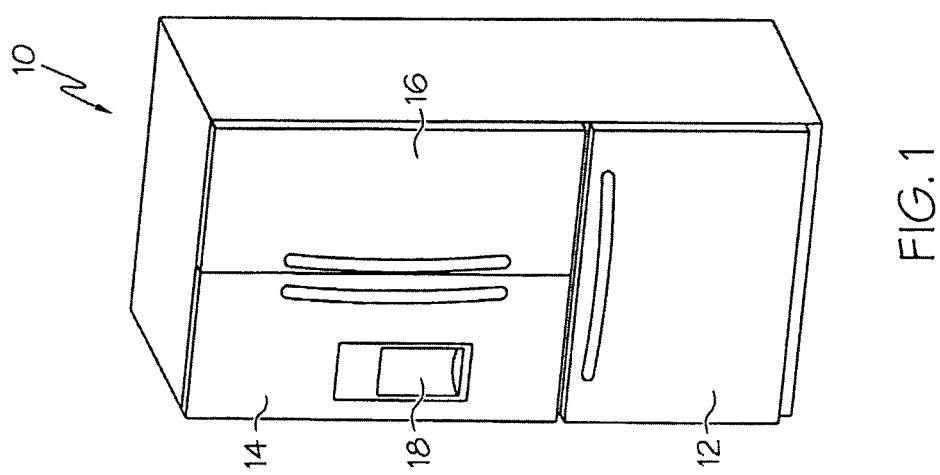
FIG. 1 is a perspective view of an example of a refrigerator and freezer apparatus that includes a freezer compartment and a fresh food compartment.

Examples of embodiments that incorporate one or more aspects of the present invention are described and illustrated in the drawings. These illustrated examples are not intended to be a limitation on the present invention. For example, one or more aspects of the present invention can be utilized in other embodiments and even other types of devices. Moreover, certain terminology is used herein for convenience only and is not to be taken as a limitation on the present invention. Still further, in the drawings, the same reference numerals are employed for designating the same elements.

Referring to FIG. 1, there is illustrated a refrigeration appliance in the form of a domestic refrigerator, indicated generally at 10. Although the detailed description of an embodiment of the present invention that follows concerns a domestic refrigerator, the invention can be employed other than with a domestic refrigerator. The refrigerator 10 in the example of FIG. 1 includes a freezer compartment 12 or section located in the lower portion of the refrigerator, access to which is had through a door. The freezer compartment 12 is used to freeze and/or maintain articles of food stored in the freezer compartment in a frozen condition. For this purpose, the freezer compartment is maintained at a temperature of 0° C. or less in a manner described below. A fresh food compartment 14 is located in the upper portion of the refrigerator 10 in this example. Access to the fresh food compartment is had through the double doors, or French doors 16. The fresh food compartment 14 serves to keep articles of food stored in the fresh food compartment 14 from spoiling by maintaining the articles of food cool but at a temperature somewhat above zero degrees Celsius so as not to freeze the articles of food. Water and ice can be dispensed through a recessed opening, or port 18 located in the door 16.

Figure 2:
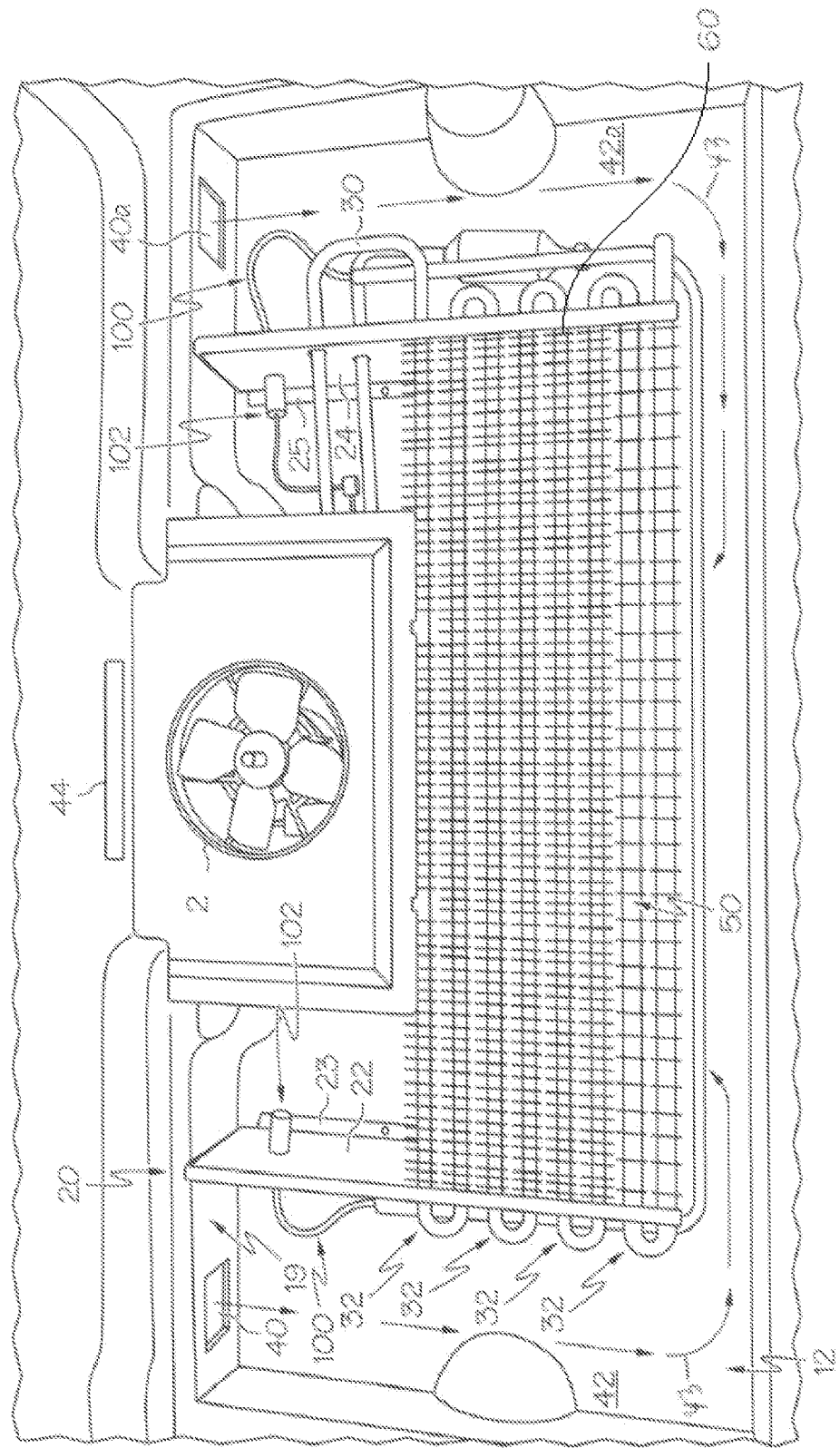
FIG. 2 is a perspective view of an evaporator assembly in the freezer compartment of FIG. 1.

As shown in FIG. 2, an example of an evaporator assembly 20 is shown in the freezer compartment 12. The evaporator assembly 20 can be placed in any compartment or outside any compartment to cool the compartment. The example shown, where the evaporator assembly 20 is in the freezer compartment 12, is just one example. The example evaporator assembly 20 can include a first end bracket 22 and a second end bracket 24 located at a first distance from the first end bracket 22. The first end bracket 22 and the second end bracket 24 are configured to mount or suspend the evaporator assembly 20. In the example shown, the end brackets are configured to mount or suspend the evaporator assembly 20 within the freezer compartment 12. The first end bracket 22 can include a mounting structure 23, such as a flange that includes apertures for receiving fasteners. The second end bracket 24 can include a second mounting structure 25 with similar features, such as a flange that includes apertures for receiving fasteners. The mounting features 23, 25 are provided to assist in installing or securing the entire evaporator assembly 20 on a liner 19 of the freezer compartment 12. The mounting features 23, 25 allow the evaporator assembly 20 to be installed in the right location each time an appliance is assembled. The evaporator assembly 20 further includes a pipe 30 and a plurality of fins 50 that include a plurality of end fins 60. The pipe 30 can be a continuous pipe 30 in one example and can be comprised of a number of different pipes or pipe portions.

The pipe 30 is provided that is configured to transport a refrigerant for exchanging heat with an air stream 43 entering from the fresh food compartment 14. At least one return duct 40 can be provided that is configured to expel the air stream 43 from the fresh food compartment 14 to a passage 42. For example, as shown in FIG. 2, two return ducts 40, 40a can be provided that are configured to expel the air stream 43 from the fresh food compartment 14 to passages 42, 42a. The passages 42, 42a, in this example, guide or direct the air stream 43 to a bottom portion of the rows of the pipe 30 of the evaporator assembly 20. The air stream 43 then flows over the evaporator assembly 20 between the first end bracket 22 and the second end bracket 24 to a fan assembly 26. The fan assembly 26 is configured to move the air stream 43 that is exiting from the evaporator assembly 20 to other portions of the appliance 10. The first end bracket 22 and the second end bracket 24 restrict the air stream 43 exiting or leaving the evaporator assembly 20 from mixing with the warm air stream entering the evaporator assembly 20. The end brackets 22, 24 are thus able to divide the different pressure air streams which have different moisture contents.

The pipe 30 can include a plurality of bent end portions 32 that are located on the exterior of the first end bracket 22 and the second end bracket 24. The bent end portions 32 are configured to allow the pipe to wind itself repeatedly to form a plurality of rows on the interior between the first end bracket 22 and the second end bracket 24. The first end bracket 22 and the second end bracket 24 can be configured to hold the pipe 30 and the plurality of fins 50 in a specific position. Generally, there is some force or spring action by the coils which could disrupt the shape of the evaporator assembly 20. The first end bracket 22 and the second end bracket 24 provide additional rigidity and can hold the evaporator assembly 20 together. There can be a plurality of rows of pipe as shown in the top view of the evaporator assembly 20 in FIG. 2 and a plurality of rows are also present in a front view of the evaporator assembly 20. Thus, the pipe can form a plurality of rows within the three-dimensional evaporator assembly 20.

As refrigerant flows through an inlet of the pipe 30, it enters each of the rows of the pipe by being transported through the bent end portions 32. The pipe 30 is provided with the plurality of fins 50 inserted on the surface of the pipe 30 and located between the first end bracket 22 and the second end bracket 24. The fins 50 can also be defined as being located between the bent end portions 32. The fins 50 maximize surface area for the air stream 43 that passes through for heat transfer purposes. Air chilled by the coils of the pipe 30 can be moved by the fan assembly 26 into the fresh-food compartment 14 through a passage, such as the exit duct 44. The exit duct 44 can extend between the fresh-food compartment 14 and the freezer compartment 12 to remove thermal energy from the fresh-food compartment 14.

A heating element 100 can be provided for defrosting the evaporator pipe 30. The heating element 100 can be attached to each end bracket 22, 24 and can be secured by a heating element connector 102. A modular connection can be provided between the heating element 100 and the power supply of the appliance. The heating element 100 can extend along a bottom portion of the evaporator assembly 20. The heating element 100 can be activated to defrost the pipe 30 at various locations, such as the bottom portion.

Figure 3:
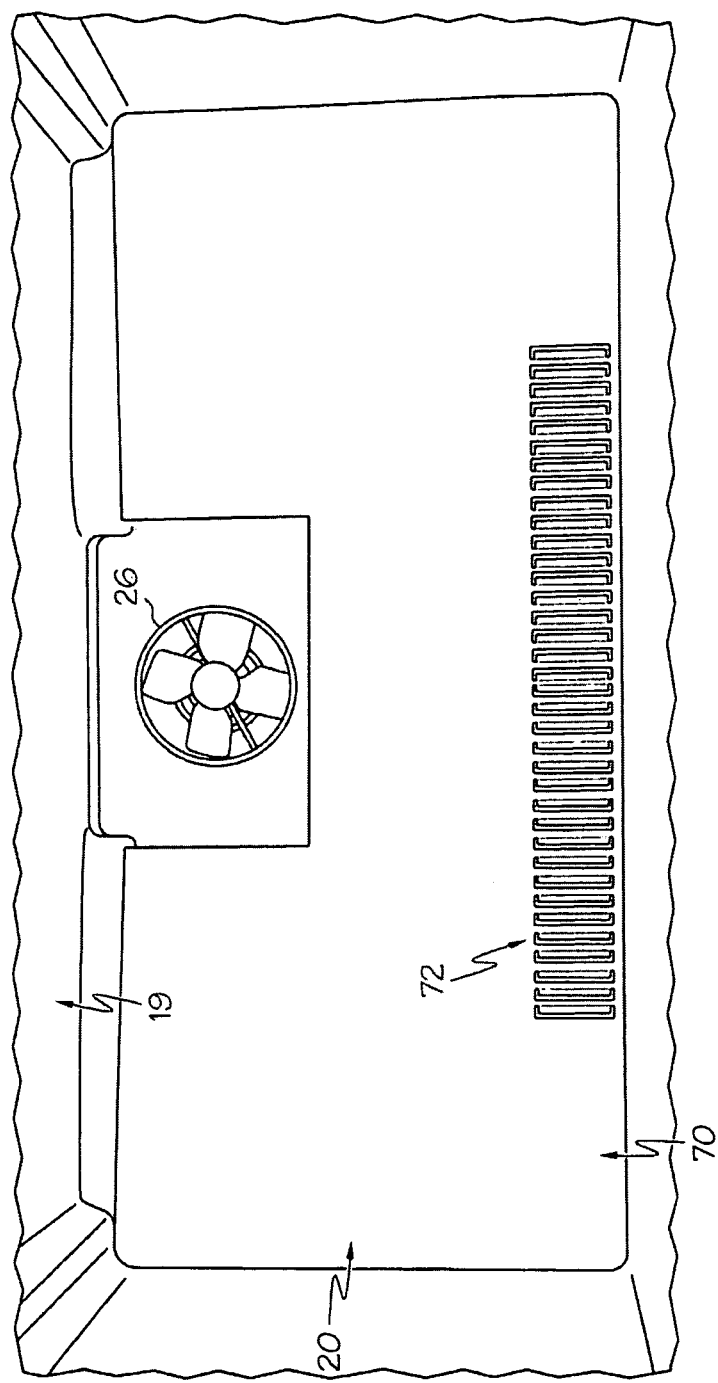
FIG. 3 is a perspective view of the evaporator assembly of FIG. 2 with a cover.

A cover 70 can be provided that is installed over the evaporator assembly 20, as shown in FIG. 3. The cover 70 can substantially conceal the entire evaporator assembly 20. The fan assembly 26 can still be exposed by the cover 70, though in other examples, the cover 70 can also conceal the fan assembly 26. The passages 42, 42a for the air stream 43 can be defined in part by the liner 19, shown in FIG. 2 and FIG. 3, and the cover 70, shown in FIG. 3. The liner 19 can include various features, walls, or channels to direct the air stream 43 in a desired direction, as shown in part by FIG. 2. The cover 70 can include a plurality of vent apertures 72. The vent apertures 72 can be configured to expel air in a plurality of directions. For example, the vent apertures 72 on the left side of the center of the cover 70 can be configured to direct air to the left direction. The vent apertures 72 on the right side of the center of the cover 70 can be configured to direct air to the right direction. Various other components, such as an evaporator pressure regulator, can be pushed back against the liner 19 before the cover 70 is installed.

Figure 4:
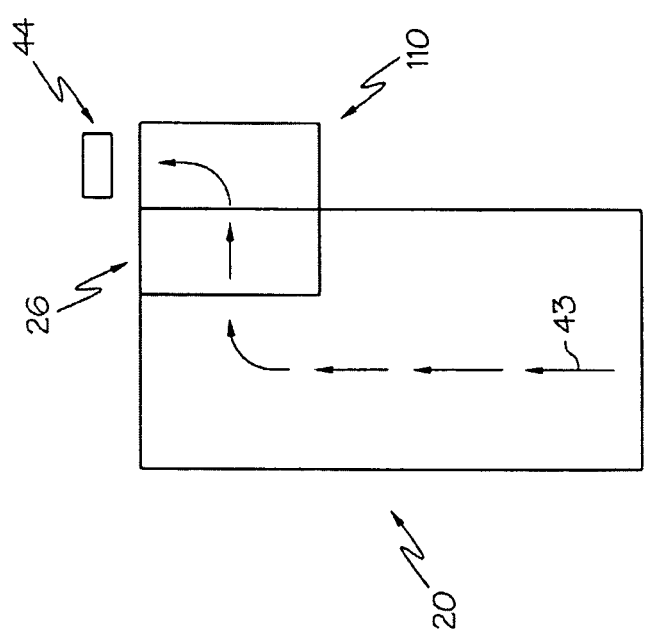
FIG. 4 is a schematic diagram of the evaporator assembly of FIG. 2 with a cover for the fan assembly.

As shown in FIG. 4, a fan assembly cover 110 can also be provided that is installed over the fan assembly 26. The fan assembly cover 110 is configured to direct the air stream 43 from the evaporator assembly 20 into the duct 44 for transportation of the air stream 43, which has now been cooled, into other portions of the appliance 10. The fan assembly cover 110 can be configured to direct the air stream 43 from the fan assembly 26 into a different direction than the direction the fan assembly 26 is directing the air stream 43. The different directions of air allow the fan assembly 26 to be placed in a location such that water or condensation from the duct 44 is unable to drip directly on the fan assembly 26. This prevents the fan assembly 26 from becoming full of frost or even frozen and inoperative. The fan assembly 26, in this example, is configured to blow air out from the evaporator assembly 20 in a generally horizontal direction. The fan assembly cover 110 can direct the air traveling horizontally into a generally vertical direction into the opening of the duct 44. Thus, in this example, any moisture at the duct 44 will drip only onto the fan assembly cover 110 and will not prevent the fan assembly 26 from operating. The fan assembly cover 110 can direct the air stream 43 into other directions as well. In other examples, the cover 70 and the fan assembly cover 110 can be a single unitary object.

Figure 5:
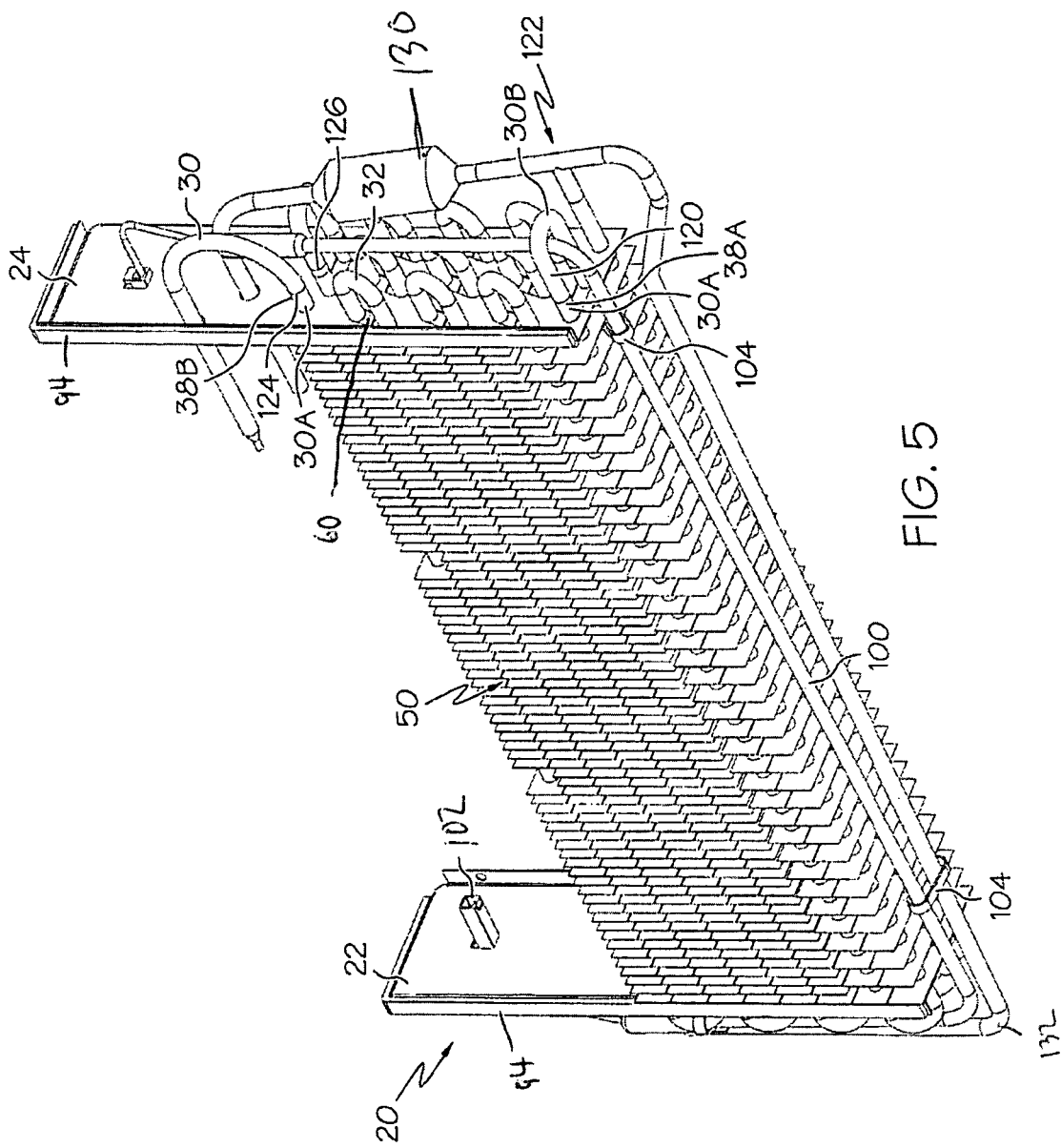
FIG. 5 is a perspective view of an example of the evaporator assembly of FIG. 2.

A perspective view of the evaporator assembly 20 is shown in FIG. 5. This view includes many of the same components as in FIG. 2. For example, the second end bracket 24 is shown with additional detail. Furthermore, the end turns of the bent end portions 32 of the pipe 30 that protrude from the second end bracket 24 can be seen in this view. In this example, the path of the refrigerant within the pipe 30 can be described. Refrigerant can enter the second end bracket 24 from the location of 122. The pipe 30 then travels to the first end bracket 22, has a bent end portion 32, and then returns to the second end bracket 24. This pattern continues until the pipe reaches the top right portion of the bends. At this point, the pipe is bent to form a different row or column of pipes, as it reaches point 126. The pipe 30 then extends towards the first end bracket 22, has a bent end portion 32, and returns to the second end bracket 24. This pattern continues until the pipe 30 reaches the lower middle portion of the bends. At this point, the pipe is bent to form a different row or column of pipes, as it reaches point 120. The pipe 30 then extends towards the first end bracket 22, has a bent end portion 32, and returns to the second end bracket 24. This pattern continues until the pipe 30 reaches the upper left portion of the bends of the bent end portions 32. At this point, the pipe is bent at point 120.

FIG. 5 also illustrates that the plurality of fins 50 can include a plurality of end fins 60 in contact with the end bracket 24. The end fins 60 refer to the fins that are closest in location to the first end bracket 22 and the second end bracket 24. The end fins 60 further restrict the air stream 43, shown in FIG. 2, from escaping during the cooling through the end bracket. The end fins 60 also restrict the air stream 43 from entering the evaporator assembly 20 before it has entered from the bottom portion of the evaporator assembly 20. Thus, the end fins 60 that are in contact with the end brackets 22, 24 improve the efficiency of the cooling of the air stream 43 as it helps to ensure that the air stream 43 is moved across the maximum amount of the pipe 30.

FIG. 5 also shows an example orientation of the heating element 100, as it extends along the bottom portion of the evaporator assembly 20. The heating element 100 can further include a plurality of strap mechanisms 104 or other fasteners. The strap mechanisms 104 can be used to secure or hold the heating element in a desired position, such as along a specific segment of the pipe 30. The heating element 100 can be installed along the bottom portion of the evaporator assembly 20 to prevent frost from accumulating on the bottom portion of the evaporator assembly 20 and inhibiting the operation of the evaporator assembly 20.

Figure 6:
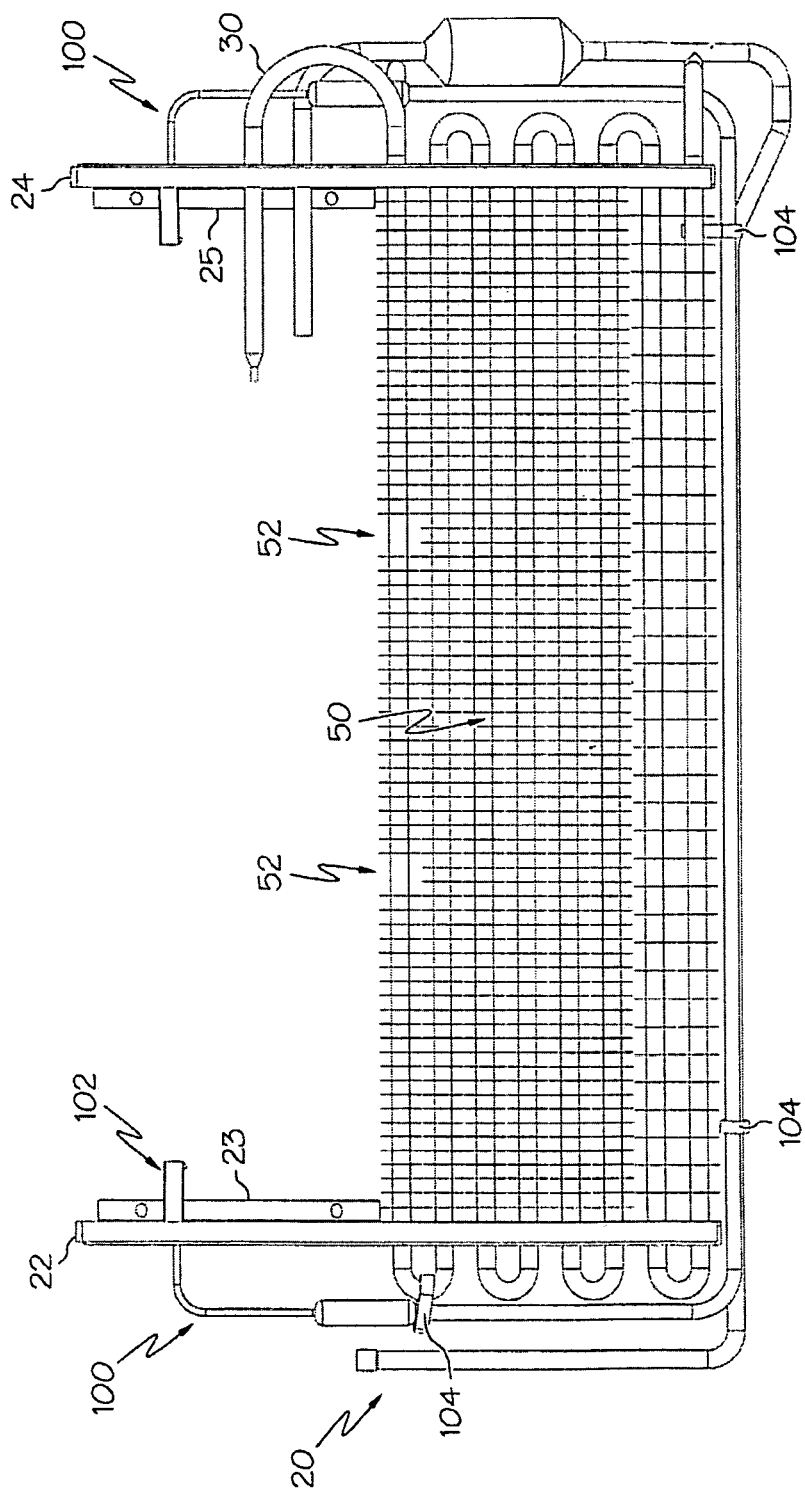
FIG. 6 is a front view of the evaporator assembly of FIG. 5.
Figure 9:
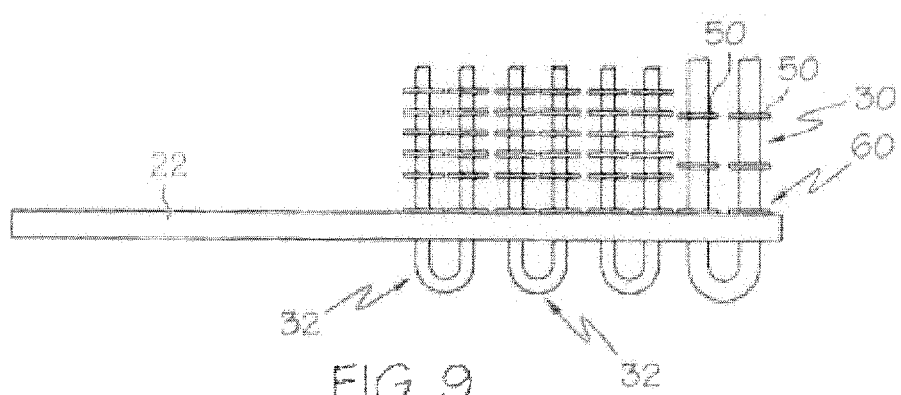
FIG. 9 is a top view of the first end bracket of FIG. 7.

FIG. 6 shows a front view of the evaporator assembly 20. This view includes many of the same components as in FIG. 2 and FIG. 5. In FIG. 6, the evaporator fins 50 are shown to have two spaces 52. These spaces 52 are provided to provide a mounting support area for the fan assembly 26, as shown in FIG. 2. The plurality of fins 50 can also have various spacing along the different rows of the pipe 30. For example, the bottom two rows can have a decreased density of fins. The decreased density can be used to reduce the amount of frost that accumulates because the air coming in is very wet and is more likely to create frost on these lower rows. The decreased density in this location helps to ensure that freezing of the evaporator assembly 20 does not occur and the evaporator assembly 20 operates efficiently and properly. The density of the fins 50 can also be different along each row of pipes, as also shown in FIG. 9 where there is more space between fins 50 on the rows that are on the bottom portion of the evaporator assembly 20 than in the other rows of the evaporator assembly 20.

In addition, FIG. 6 shows that either one heating element 100 or two heating elements 100 can be mounted, such that the first end bracket 22 and the second end bracket 24 both carry a heating element connector 102 for connection to a power supply. The heating element 100 can also be shown as extending along the bottom portion of the evaporator assembly 20.

Figure 7:
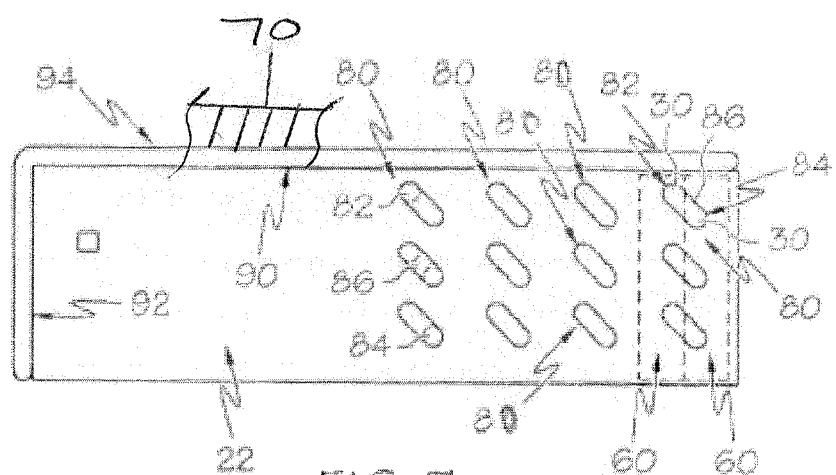
FIG. 7 is a side view of a first end bracket shown in FIG. 2.

As shown in FIG. 7, an example of the first end bracket 22 is shown from a side view. The first end bracket 22 includes a plurality of apertures 80. The plurality of apertures 80 is configured to receive each bent end portion 32 of the pipe 30. To simplify assembly, the apertures 80 can have a size that is greater than the bent end portions 32 to easily slide the end bracket 22 over the bent end portions 32. In addition, as shown in the aperture on the upper right portion of FIG. 7, the aperture 80 receives a portion of the pipe 30 at a first end 82 of the aperture 80 and a portion of the pipe 30 re-enters the aperture 80 at a second end 84 of the aperture 80 after being bent. The aperture 80 can further include an intermediate portion 86 between the first end 82 and the second end 84.

As a result of the apertures 80 being of a relatively larger size than the bent end portions 32 of the pipe 30, cool air from the evaporator assembly 20 can escape through the aperture 80, especially through the intermediate portion 86, to the exterior of the evaporator assembly 20 and the end brackets 22, 24. If the cool air escapes, the air stream 42, shown in FIG. 2, will not be cooled as efficiently. As already shown partially in FIG. 5, to restrict the loss of the air stream, end fins 60 can be installed in contact with the first end bracket 22 and the second end bracket 24 to prevent air from passing between the end fins 60 and the end brackets 22, 24 without encountering each of the heat transfer fins 50, 60. In FIG. 7, broken lines show where the end fins 60 are located relative to the apertures 80 of the first end bracket 22. By blocking the apertures 80, this prevents the reintroduction of warm air into the fresh food compartment without being first exposed to a sufficient heat transfer surface area to cool the air as desired, by encountering each of the heat transfer fins 50, 60. In this example, the warm returning air stream 43 is guided toward the bottom of the evaporator assembly 20 and the bottom row of the pipe 30 from where the air stream 43 will pass over the greatest possible heat transfer surface area to efficiently cool the air stream 43. In the example shown, two end fins 60 are provided to restrict or seal the air stream 43 from flowing through each aperture 80 on the first end bracket 22 and the second end bracket 24.

The first end bracket 22 can further include a first edge 90 and a second edge 92. The first edge 90 is configured to contact the cover 70 shown in FIG. 3. The second edge 92 is configured to contact a wall of the liner 19 shown in FIG. 2. A gasket 94 can be provided on the first edge 90 and the second edge 92 of each end bracket 22, 24 to prevent frost formation on the liner 19 and the cover 70. The gasket 94 prevents frost formation on the cover 70 due to the gasket 94 separating each end bracket 22, 24 from contacting the liner 19 or from contacting the cover 70.

Figure 8:
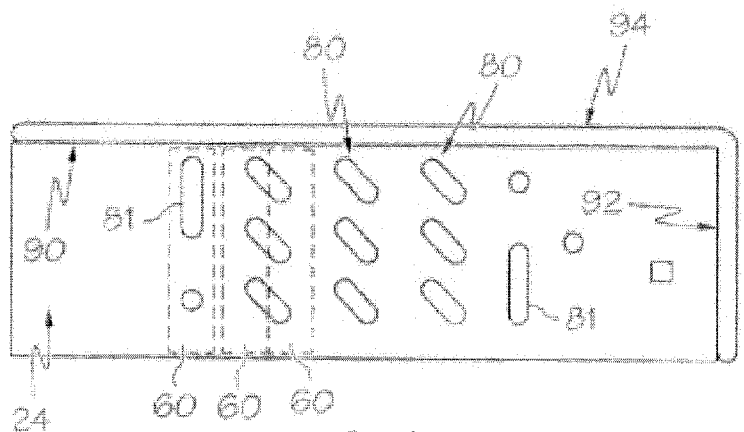
FIG. 8 is a side view of a second end bracket shown in FIG. 2.

As shown in FIG. 8, an example of the second end bracket 24 is shown from a side view. The second end bracket 24 also includes a plurality of apertures 80. The plurality of apertures 80 is configured to receive the bent end portions 32 of the pipe 30. It is appreciated that the second end bracket 24 can include a second aperture 81 of a different shape to allow a set of rows of the pipe 30 in a first vertical plane, such as the top layer of coils, to reach a second vertical plane, such as a middle layer of coils. The second end bracket 24 also includes a first edge 90 and a second edge 92. The first edge 90 is configured to contact the cover 70 shown in FIG. 3. The second edge 92 is configured to contact a wall of the liner 19 shown in FIG. 2. A gasket 94 can be provided on the first edge 90 and the second edge 92 of each end bracket 22, 24 to prevent frost formation on the liner 19 and the cover 70. The gasket 94 on the second end bracket 24 functions in the same way as on the first end bracket 22.

As shown in FIG. 9, a top view of FIG. 7 is shown, with the pipe 30 and the bent end portions 32 being received by the end bracket 22. An example of the end fins 60 being in contact with the end bracket 22 is also shown. The dimensions of the fins 50 and the end fins 60 are by example only. The arrangement of the fins 50 can be altered such that varying densities of fins 50 be provided as desired on different rows of the pipe 30.

Figure 10A:
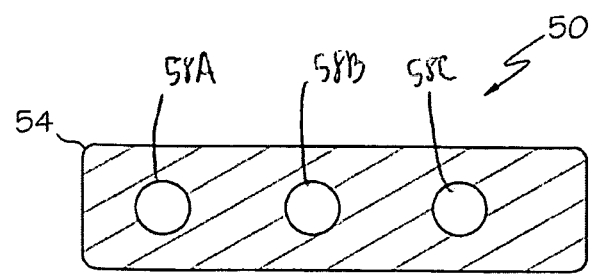
FIG. 10A is a front view of a fin of FIG. 2 where the fin is in a first orientation.
Figure 10B:
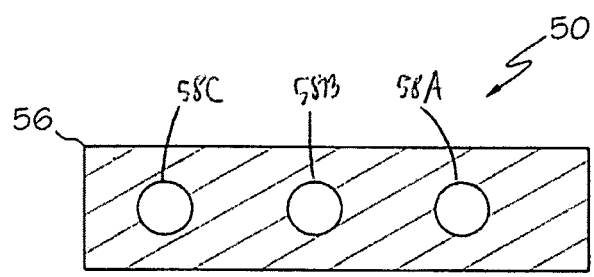
FIG. 10B is a front view of a fin of FIG. 2 where the fin is in a second orientation.

As shown in FIG. 10A, an example fin 50 is shown. In this example, each of the fins 50 include three pipe apertures 58A, 58B, and 58C to receive three different segments of the pipe 30. The pipe apertures 58A, 58B, and 58C are not large enough to receive any of the U-turn, bent end portions 32 of the pipe 30 and only can receive a segment of the pipe 30 of the evaporator coils. In one example, the first pipe aperture 58A can receive a pipe located on the left side of the end bracket 24 in FIG. 5. The second pipe aperture 58B can receive a pipe located in the middle of the end bracket 24. The third pipe aperture 58C can receive a pipe located on the right side of the end bracket 24. In FIG. 10A, the fin 50 is in a first orientation 54. As shown in FIG. 10B, the fin 50 can be in a second orientation 56. The first orientation 54 can be opposite the second orientation 56, such that the fin 50 is upside-down. This is shown by the first pipe aperture 58A being located on the left in FIG. 10A and the first pipe aperture 58A being located on the right in FIG. 10B.

Figure 11:
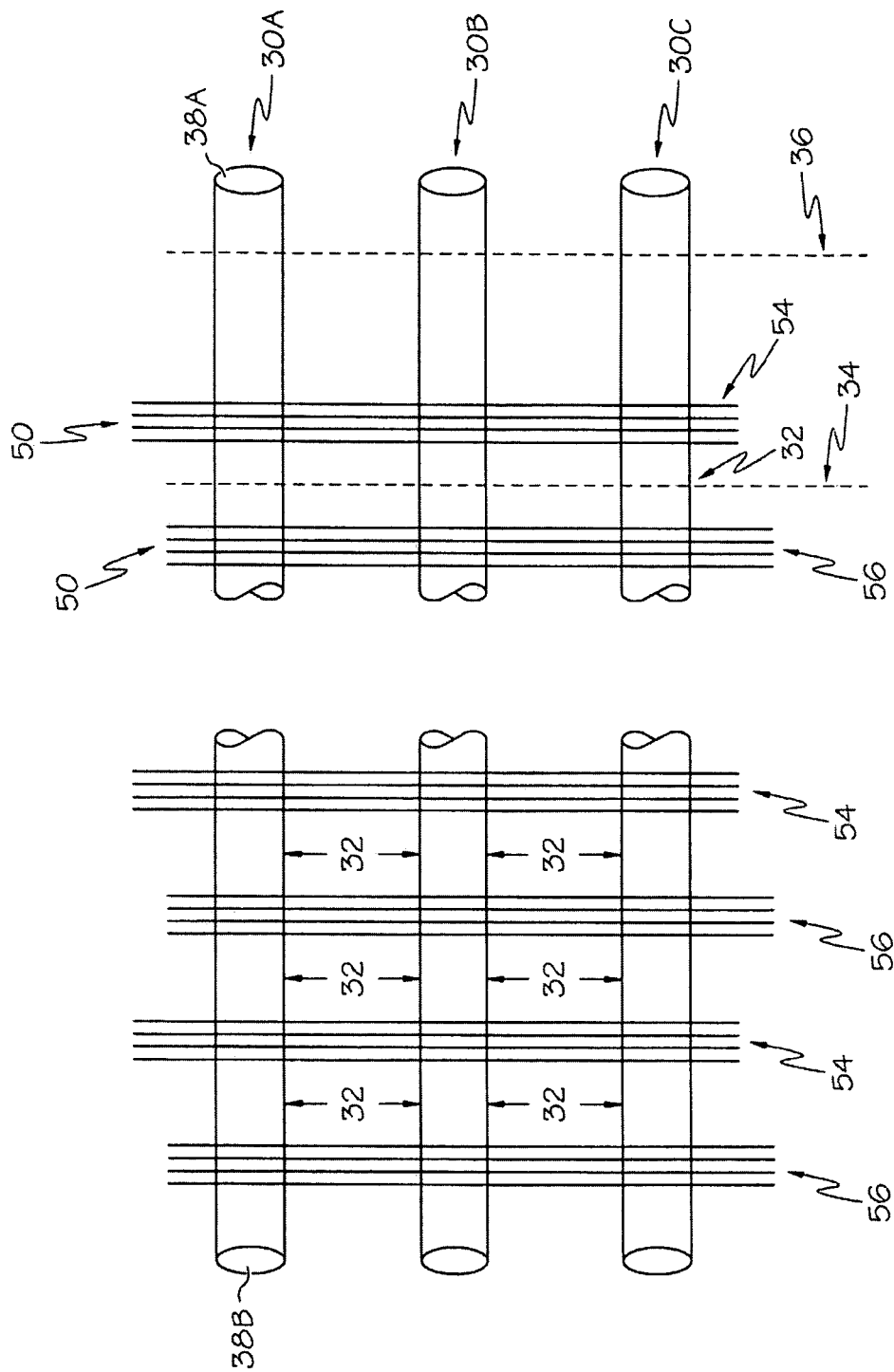
FIG. 11 is front view of a plurality of pipes used for assembling the evaporator assembly of FIG. 2.

A method of assembling the evaporator assembly 20 for a refrigeration appliance can also be provided. The example method provided is one example of a method for forming the evaporator assembly 20. FIG. 11 shows a plurality of pipes, which in this example there are three pipes (30A, 30B, 30C). For example, the first pipe 30A starts at a first end 38A and terminates at a second end 38B. Each of the pipes 30A, 30B, 30C are in a different plane, such as in a different vertical plane. A first group of fins can then be inserted on the pipes 30A, 30B, 30C from the second end 38B and moved towards the first end 38A. The first group of fins can have a first orientation 54, as shown in FIG. 10A. Each fin 50 receives each of the pipes 30A, 30B, 30C provided. A second group of fins 50 are inserted in the second orientation 56. Additional groups of fins are inserted in orientations alternating between the first orientation 54 and the second orientation 56. The orientations of the fins 50 in combination with the orientation of the bent end portions 32 allow only one type of fin 50 to be produced for the entire evaporator assembly. Each of the bends actually occur at an angle relative to a horizontal line, as shown in FIG. 7 and FIG. 8. The difference in height of the pipe portions corresponds to the different between the third pipe aperture 58C and the right edge of the fin 50 in FIG. 10A. Thus, the alternating orientations 54, 56 allow the fins 50 to be located at the same height relative to the end brackets 22, 24, as shown best in FIG. 5.

Figure 12:
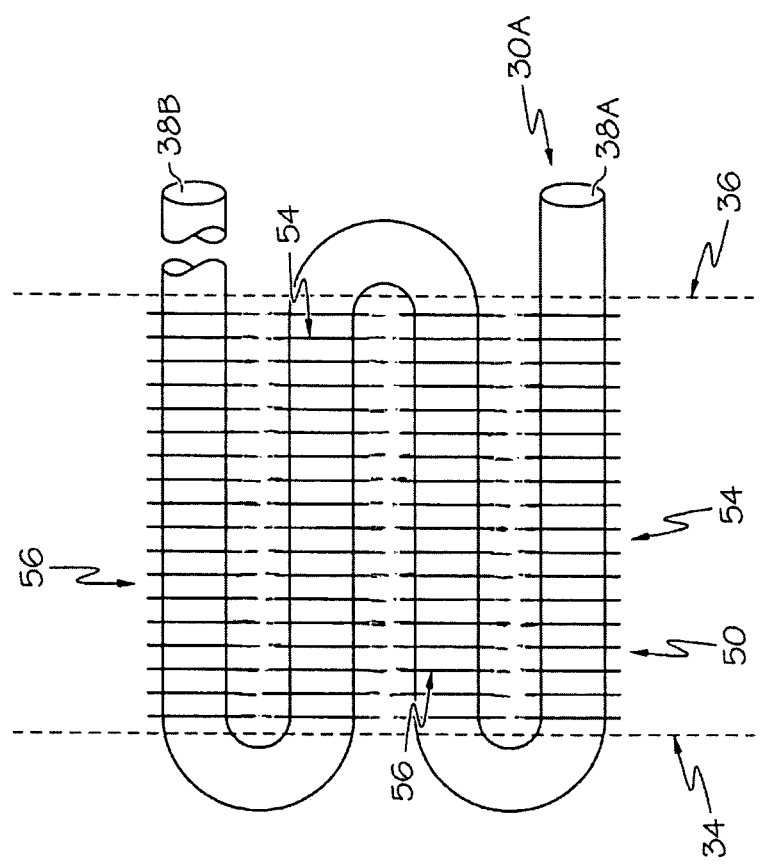
FIG. 12 is a top view of the plurality of pipes of FIG. 11 after the pipes have been bent.

After all of the groups of fins 50 are inserted, the pipes can then be bent. Each of the pipes 30A, 30B, 30C can first be bent along a first axis 34 to form a second row of pipes. Each of the pipes 30A, 30B, 30C can then be bent along a second axis 36 to form a third row for each of the plurality of pipes. A number of bends can be repeatedly made along the first axis 34 and the second axis 36 to form additional rows of the pipe. A top view of the first pipe 30A is shown in FIG. 12 which shows a plurality of bends along the first axis 34 and the second axis 36. It is appreciated that the fins in this view also extend to the second pipe 30B and the third pipe 30C. After each of the bends, it can be seen that the first row of the pipe will include fins in a first orientation 54. The second row will include fins 50 in a second orientation 56. The first orientation can be upside-down from the orientation but other alternative orientations can also be used.

A first end bracket 22, as shown in FIG. 7, can then be installed about the first axis 34 by providing the first end bracket 22 with a plurality of apertures 80 that receive each of the plurality of bent end portions 32 about the first axis. A second end bracket 24, as shown in FIG. 8, can than be installed about the second axis 36 by providing the second end bracket 24 with a plurality of apertures 80, 81 that receive each of the plurality of bent end portions 32 about the second axis 36. The plurality of fins 50 located closest to each end bracket 22, 24 can then be placed in contact with each end bracket 22, 24 to prevent air from flowing through the plurality of apertures 80, 81 on the end brackets 22, 24.

The pipes 30A, 30B, 30C can then be joined together in a number of ways, such as by welding. The first end and the second end of each of the plurality of pipes 30A, 30B, 30C can be welded to other ends or connecting pipe segments to assemble the plurality of pipes into one continuous page. For example, with reference to FIG. 5, a first weld can be made at point 120. This weld would attach an end of the first pipe 30A to an end of the second pipe 30B. A second weld can be made at point 122 to attach the third pipe 30C to an exit pipe that connects to an accumulator 130. The second weld can also be made at point 122 to join a pipe 132 that receives refrigerant from another evaporator. The pipe 132 can transport refrigerant from a storage evaporator that is configured to maintain the temperature of air within a fresh food compartment and from an ice maker evaporator that is configured to produce ice. A third weld can be made at point 124 to attach a second end of the first pipe 30A to an entry or exit pipe. A fourth weld can be made at point 126 to attach second end of the second pipe 30B to a second end of the third pipe 30C. The method can include various numbers of pipes and various bending designs. A first gasket can also be installed on a first edge and a second edge of the first end bracket. A second gasket can also be installed on a first edge and a second edge of the second end bracket. The gasket that is installed is described with regards to FIG. 7 and FIG. 8. The heating element 100 can also be installed on the first end bracket 22 and the second end bracket 24. The heating element 100 extends between the first end bracket 22 and the second end bracket 24 on the bottom portion of the evaporator assembly 20. The heating element 100, as already described, is configured for defrosting the continuous pipe 30.

The invention has been described with reference to the example embodiments described above. Modifications and alterations will occur to others upon a reading and understanding of this specification. Example embodiments incorporating one or more aspects of the invention are intended to include all such modifications and alterations insofar as they come within the scope of the appended claims.

What is claimed is:

1. A refrigeration appliance including at least a first compartment and a second compartment and comprising:
   at least one air duct located between the first and second compartments and configured to allow air to flow from the second compartment into and along the first compartment;
   an evaporator including first and second opposed ends located in the first compartment and further including a pipe having a plurality of bent end portions to allow the pipe to wind itself repeatedly to form a plurality of rows, wherein a plurality of fins including a plurality of end fins are on the pipe;
   a cover configured to overlie the evaporator and at least a first air passage and bound at least a first portion of the first air passage;
   a first bracket located adjacent the first opposed end of the evaporator and supporting the evaporator thereat, the first bracket being mounted to a liner of the first compartment and the first bracket being configured to contact the cover and bound at least a second portion of the first air passage and preclude air from flowing into the first opposed end of the evaporator from the first air passage; and
   a second bracket located adjacent the second opposed end of the evaporator and supporting the evaporator thereat; and
   wherein the plurality of end fins are placed in direct contact with the first end bracket, and
   wherein the first bracket and second bracket each include a plurality of apertures to receive each bent end portion of the pipe, and wherein the plurality of end fins are restricting and sealing the air stream from flowing through the plurality of apertures of the first bracket and the second bracket.

2. The refrigeration appliance of claim 1 including at least one other air duct located between the first and second compartments and configured to allow air to flow from the second compartment into and along the first compartment and wherein:
   the cover is configured to overlie a second air passage and bound at least a first portion of the second air passage; and
   the second bracket is mounted to the liner and the second bracket being configured to contact the cover and bound at least a second portion of the second air passage and preclude air from flowing into the second opposed end of the evaporator from the second air passage.

3. The refrigeration appliance of claim 2 wherein:
   a gasket is interposed between and in contact with the first bracket and the underside of the cover at the location where the cover overlies the first bracket, the gasket being configured to prevent the flow of air into the first end of the evaporator from the first air passage and out of the evaporator into the first air passage; and
   a second gasket is interposed between and in contact with the second bracket and the underside of the cover at the location where the cover overlies the second bracket, the second gasket being configured to prevent the flow of air into the second end of the evaporator from the second air passage and out of the evaporator into the second air passage.

4. The refrigeration appliance of claim 2 wherein the at least one air duct is configured to allow air to flow from the second compartment into the first passage and the at least one other air duct is configured to allow air to flow from the second compartment into the second passage.

5. The refrigeration appliance of claim 4, wherein the at least one air duct and the at least one other air duct are coplanar and vertically oriented relative to the evaporator.

6. The refrigeration appliance of claim 1 wherein;
a gasket is located between and in contact with the first bracket and the underside of the cover at the location where the cover overlies the first bracket, the gasket being configured to prevent the flow of air into the first end of the evaporator from the first air passage and out of the evaporator into the first air passage.

7. The refrigeration appliance of claim 1, wherein the plurality of end fins are placed in direct contact with the second bracket.

8. A refrigeration appliance including at least a first compartment and a second compartment and comprising:
at least one air duct located between the first and second compartments and configured to allow air to flow from the second compartment into and along the first compartment;
an evaporator including first and second opposed ends located in the first compartment and further including a pipe having a plurality of bent end portions to allow the pipe to wind itself repeatedly to form a plurality of rows, wherein a plurality of fins including a plurality of end fins are on the pipe;
a cover configured to overlie the evaporator and at least a first air passage and bound at least a first portion of the first air passage;
a first bracket located adjacent the first opposed end of the evaporator and supporting the evaporator thereat, the first bracket being mounted to a liner of the first compartment and the first bracket being configured to contact the cover and bound at least a second portion of the first air passage and preclude air from flowing into the first opposed end of the evaporator from the first air passage; and
a second bracket located adjacent the second opposed end of the evaporator and supporting the evaporator thereat; and
wherein the plurality of end fins are placed in direct contact with the first end bracket,
wherein the first bracket and second bracket each include a plurality of apertures to receive each bent end portion of the pipe, and wherein the plurality of end fins are restricting and sealing the air stream from flowing through the plurality of apertures of the first bracket and the second bracket, and
wherein the plurality of end fins each comprise a surface having an aperture that the pipe extends through, further wherein the surface faces and is placed in direct contact with the first end bracket.

9. The refrigeration appliance of claim 8, wherein the surface of each of the plurality of end fins is restricting and sealing the air stream from flowing through at least one of the plurality of apertures of the first bracket and the second bracket.

* * * * *